US012437634B2

(12) United States Patent
Schatz et al.

(10) Patent No.: US 12,437,634 B2
(45) Date of Patent: Oct. 7, 2025

(54) KICK TRAFFIC SIGNAL SWITCH

(71) Applicants: Robert Anthony Schatz, Glenville, PA (US); Michelle Lynn Mills, Hanover, PA (US)

(72) Inventors: Robert Anthony Schatz, Glenville, PA (US); Michelle Lynn Mills, Hanover, PA (US)

( * ) Notice: Subject to any disclaimer, the term of this patent is extended or adjusted under 35 U.S.C. 154(b) by 239 days.

(21) Appl. No.: 18/094,086

(22) Filed: Jan. 6, 2023

(65) Prior Publication Data

US 2023/0222904 A1 Jul. 13, 2023

Related U.S. Application Data

(60) Provisional application No. 63/298,876, filed on Jan. 12, 2022.

(51) Int. Cl.
*G08G 1/07* (2006.01)
*G08G 1/005* (2006.01)

(52) U.S. Cl.
CPC ............... *G08G 1/07* (2013.01); *G08G 1/005* (2013.01)

(58) Field of Classification Search
CPC .......... G08G 1/07; G08G 1/005; G08G 1/095; H01H 3/14; H01H 9/04; H01H 3/122
See application file for complete search history.

(56) References Cited

U.S. PATENT DOCUMENTS

| | | | |
|---|---|---|---|
| 1,805,406 A | 5/1931 | Lackner | |
| 2,865,017 A | 12/1958 | Heikes | |
| 3,495,213 A | 2/1970 | Nahas | |
| 5,208,584 A | 5/1993 | Kaye et al. | |
| 5,612,596 A | 3/1997 | Wiese | |
| 7,250,875 B2 | 7/2007 | Schnackenberg | |
| 8,228,210 B2 | 7/2012 | Sitbon | |
| 2017/0045907 A1* | 2/2017 | Enshaee | G07C 9/00944 |
| 2022/0180742 A1* | 6/2022 | Ramirez | G08G 1/096 |

FOREIGN PATENT DOCUMENTS

KR 10-2015-0122971 A 11/2015

* cited by examiner

*Primary Examiner* — Daryl C Pope
(74) *Attorney, Agent, or Firm* — Birch, Stewart, Kolasch & Birch, LLP

(57) ABSTRACT

A kick traffic signal switch includes a housing having a plurality of dowel retention plates, a micro switch connected to the housing via two micro switch dowels, a pressure plate movably connected to the housing, pressing of the pressure plate by a user causes activation of the micro switch; and a bottom plate connected to a rear face of the housing.

15 Claims, 13 Drawing Sheets

KICK TRAFFIC SIGNAL SWITCH

CROSS REFERENCE TO RELATED APPLICATION

The present application claims priority under 35 U.S.C. § 119(e) to U.S. Provisional Application No. 63/298,876, filed Jan. 12, 2022, the disclosure of which is incorporated herein by reference in their entirety.

BACKGROUND OF THE INVENTION

1. Field of Invention

The present invention is directed to an improved traffic signal switch that is in the form of a bar-shape and is mounted lower on a traffic pole than an existing traffic signal switch in order to allow a user to activate the switch by pressing with their foot and/or legs, to permit reliable, hands-free activation of the switch.

2. Description of the Background Art

Crosswalk accidents are at an all-time high likely because people do not want the risk of germs. Existing traffic light/signal switches/controllers either require human hand contact to operate or operate via a wireless means that can be unexpectedly tripped. For example, a wireless traffic signal switch can be activated by a person walking past the wireless traffic signal switch, and thus can be improperly activated and disrupt traffic flow. Further, existing traffic signal switches are difficult to press for individual in wheelchairs or are shorter in stature.

Examples of a traffic signal transfer switch is provided by Schnackenberg, U.S. Pat. No. 7,250,875, which is incorporated by reference in its entirety. Further, an example of a traffic control load switch, which can be implemented for pedestrian traffic, is provided by Wiese, U.S. Pat. No. 5,612,596, which is incorporated by reference in its entirety.

The present invention reduces and/or eliminates exposure of germs and/or viruses, by allowing a user to press a traffic signal switch using their foot or another portion of their leg. Further, the present invention allows an individual crossing the street in a wheelchair or on a bicycle to press the switch with their wheel, for example. In addition, a blind person can step on the switch or kick the switch. Further, or a person who is otherwise unable to press a switch with their hands, such as an individual with full hands (e.g., holding bags or the like), can step on or kick the switch.

SUMMARY OF THE INVENTION

The present invention enables a pedestrian the ability to use his foot to activate a traffic signal switch. A user on a wheelchair or bicyclist can use their wheel to tap the switch. A pedestrian can use their foot to tap the switch with no exposure to germs at the crosswalk. The application would adapt to the existing wiring and mechanisms that currently operate by a finger push (or hand push).

The present invention is directed to a pole mounted switch that replaces or is used in conjunction with an existing switch. The pole mounted switch is elongated and is in the form of a bar-type switch that is used for triggering a momentary stop when pressed, the momentary stop controlling and activating a crosswalk traffic light for allowing a user to cross the crosswalk. The pole mounted switch can be mounted low on a traffic pole so as to allow a user to press the switch with their leg/foot and can be termed a kick-switch.

The traffic signal switch according to the present invention will provide a pedestrian hands-free activation for traffic when used at a crosswalk (e.g., a user using their foot, using a wheelchair tire, using a bicycle tire, or the like). The traffic signal switch according to the present invention will provide a handicapped user hands-free activation for a traffic switch (e.g., a wheelchair tire) or a bicyclist hands-free activation of a traffic switch when used at a crosswalk (e.g., using a bicycle tire). The traffic signal switch according to the present invention will also provide a sight impaired hands-free activation of a traffic switch when used at a crosswalk (e.g., by pressing with a walking stick).

The traffic signal switch according to the present invention can also be adapted to automatic door openers, water fountains/faucets, lighting, tools on/off and emergency shut off, emergency signal (e.g., fire box), elevator call, toilet flushing, or any location that typically requires a hand activation and is connected to electricity, such as an electrical power grid, a battery or the like.

A traffic signal switch can include a housing, a micro switch connected to the housing via two micro switch dowels, the micro switch including wiring that is configured to be connected to wiring of an existing traffic signal switch, a pressure plate movably connected to the housing, pressing of the pressure plate by a user causes activation of the micro switch, and a bottom plate connected to a rear face of the housing.

The housing can include a plurality of dowel retention slots, and the traffic signal switch can further include a plurality of dowels being retained in the plurality of dowel retention slots, the plurality of dowels connecting the pressure plate to the housing.

The pressure plate can include a plurality of elongated holes and each of the plurality of dowels can extend through a respective one of the plurality of elongated holes of the pressure plate such that a space is provided between each of the plurality of dowels and a portion of the respective elongated hole. The space provided between each of the plurality of dowels and the portion of the respective elongated hole allows for relative movement of the pressure plate with respect to the housing.

The traffic signal switch can further include a plurality of dowel retention plates disposed in the dowel retention slots and fixing the plurality of dowels to the housing.

Each dowel retention slot can include a circular groove for accommodating a respective one of the plurality of dowels and a rectangular groove for accommodating a respective one of the plurality of dowel retention plates.

The housing further can include two micro switch dowel retention slots, and the two micro switch dowels are retained in the two micro switch dowel retention slots.

The pressure plate can include two center slots for allowing movement of the pressure plate with respect to housing while avoiding contact between the micro switch dowels and the pressure plate.

The housing can include flanges extending from lateral ends of the housing, and the flanges of the housing allow for the traffic signal switch to be connected to a fixed object by a mechanical clamping means.

The traffic signal switch can further include a plurality of springs connected between the pressure plate and the bottom plate. The plurality of springs permit the pressure plate to return to an original position after being pressed by the user.

Each of the plurality of springs is fixed between the pressure plate and the bottom plate by a spring dowel, and each spring dowel is fastened to the pressure plate and to the bottom plate by a fastener.

The micro switch can include a micro switch roller that is configured to contact the pressure plate due-to pressing of the pressure plate by the user, to cause the micro switch to activate.

The pressure plate is provided with a plurality of protrusions, and the plurality of protrusions have a friction coefficient higher than other portions of the pressure plate.

A method of assembling a traffic signal switch to an existing traffic pole includes first providing a traffic signal switch, the traffic signal including a housing, a micro switch connected to the housing via two micro switch dowels and including wiring, a pressure plate movably connected to the housing, pressing of the pressure plate by a user causes activation of the micro switch, and a bottom plate connected to a rear face of the housing. The method further includes attaching the traffic signal switch to the existing traffic pole and connecting the wiring of the micro switch to existing wiring of an existing traffic signal switch.

The housing can include flanges extending from lateral ends of the housing, and the method can further comprise connecting the flanges of the housing allow to a fixed object via at least one clamp.

The housing can include a plurality of dowel retention slots, and the traffic signal switch can further include a plurality of dowels being retained in the plurality of dowel retention slots, the plurality of dowels connecting the pressure plate to the housing.

The pressure plate can include a plurality of elongated holes. Each of the plurality of dowels extends through a respective one of the plurality of elongated holes of the pressure plate and a space is provided between each of the plurality of dowels and a portion of the respective elongated hole. The space provided between each of the plurality of dowels and the portion of the respective elongated hole allows for relative movement of the pressure plate with respect to the housing.

The traffic signal switch further can include a plurality of dowel retention plates disposed in the dowel retention slots and fixing the plurality of dowels to the housing, and each dowel retention slot can include a circular groove for accommodating a respective one of the plurality of dowels and a rectangular groove for accommodating a respective one of the plurality of dowel retention plates.

The traffic signal switch further can include a plurality of springs connected between the pressure plate and the bottom plate, and the plurality of springs permits the pressure plate to return to an original position after being pressed by the user.

Each of the plurality of springs is fixed between the pressure plate and the bottom plate by a spring dowel, and each spring dowel is fastened to the pressure plate and to the bottom plate by a fastener.

The micro switch can include a micro switch roller that is configured to contact the pressure plate due to pressing of the pressure plate by the user, to cause the micro switch to activate.

Further scope of applicability of the invention will become apparent from the detailed description given hereinafter. However, it should be understood that the detailed description and specific examples, while indicating embodiments of the invention, are given by way of illustration only, since various changes and modifications within the scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
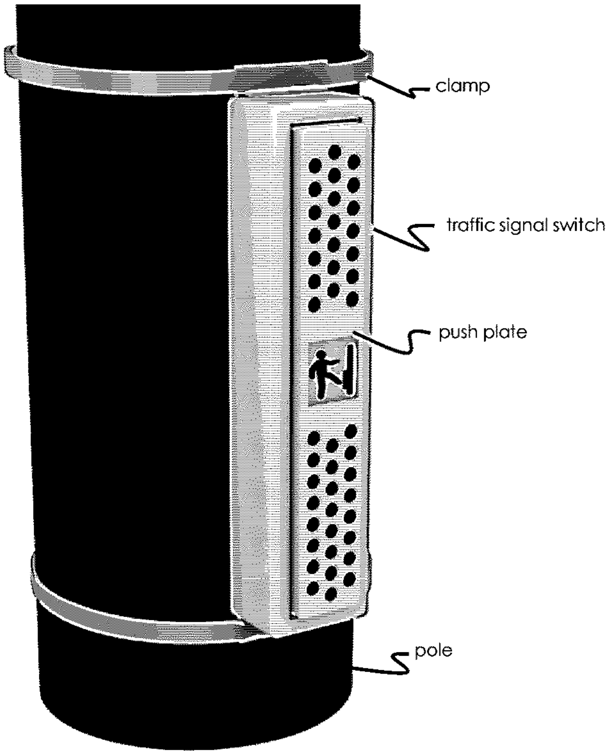
FIG. 1 is a front perspective view of the traffic signal switch mounted to a pole according to an embodiment of the present invention.

The present invention will now be described with reference to the accompanying drawings, wherein the same reference numerals have been used to identify the same or similar elements throughout the several views.

FIG. 1 is a front perspective view of the kick traffic signal switch (herein "traffic signal switch) mounted to an existing pole according to an embodiment of the present invention. The traffic signal switch is illustrated mounted to the pole, such as a traffic light pole as known in the art, via clamps (e.g., metal clamps or clamps made of any type of material, or any other type of mechanical clamping means). However, the traffic signal switch can be fastened to the pole by any other means, such as by utilizing fasteners, adhesives, and the like.

The traffic signal switch according to the present invention includes a housing that can include two extensions (e.g., projections or flanges) extending from length-wide ends of the traffic signal switch, to allow for engagement of the clamps to fix the traffic signal switch to the pole, as illustrated in FIG. 1. Further, the traffic signal switch according to the present invention includes at least one micro switch, and the at least one micro switch can include a wire (or wires) to be connected to wiring of an existing traffic light switch, illustrated in FIG. 3, for example, by splicing, soldering and the like. That is, the traffic signal switch according to an embodiment of the present invention can be mounted an existing traffic signal switch and can be directly connected thereto by the wiring of the at least one micro switch. Further, the micro switch can be provided in plurality. The positioning of the traffic signal switch can adjusted to be close to the ground to allow a user to kick or otherwise press a pressure plate assembly of the traffic signal switch with their feet, or to otherwise allow a person of shorter stature or a person in a wheelchair to easily press the traffic signal switch. The "pressure plate assembly" can also be referred to as the "pressure plate," through this specification and the claims.

The traffic signal switch according to an embodiment of the present invention further includes a pressure plate assembly at a front surface thereof. The pressure plate assembly can include the at least one micro switch that is activated when a user presses the pressure plate assembly. Alternatively, the at least one micro switch can be separate from the pressure plate assembly. The pressure plate assembly can be mounted within the housing via a rear surface of the housing and can be movable within the housing to allow for the at least one micro switch to activate, to send a signal through the wiring of the at least one micro switch to an existing traffic signal controller to indicate that a user is present in a crosswalk. This in turn allows for the activation of a crosswalk light to indicate it is safe for the user(s) to walk through an intersection of the crosswalk, as known in the art.

Figure 2:
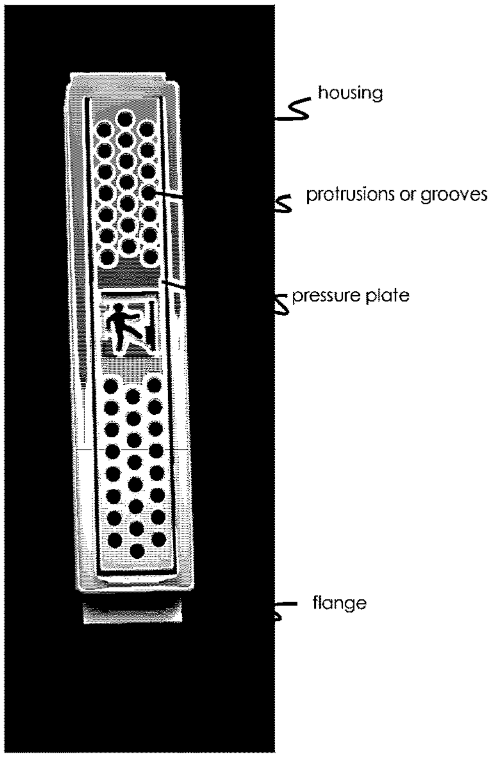
FIG. 2 is a front perspective view of the traffic signal switch according to an embodiment of the present invention.

FIG. 2 of the present application is a front view of the pressure plate assembly and the housing, showing the protrusions (or grooves) of the front surface of the pressure plate assembly and a label located substantially at a center of the pressure plate assembly. The protrusions can have any shape, such as circular, oblong, quadrilateral, etc., and can be comprised of rubber or any other material having a sufficient coefficient of friction to allow a user to easily press the pressure plate assembly to activate the micro switch, which activates the crosswalk traffic light, as noted above. Further, the pressure plate assembly can have any number of protrusions, and the protrusions can have any size, and can cover a majority of a front surface of the pressure plate assembly.

FIG. 2 also illustrates the flanges extending from lateral ends of the housing of the traffic signal switch. The flanges permit clamps to fix the traffic signal switch to a pole or other fixture, and can be to receive any type of clamp. As an alternate fixing method, each of the flanges also include holes to allow for receiving fasteners to attach the traffic signal switch to any member, such as wood, metal, ceramic (i.e., masonry) or the like. Fasteners can include screws, bolts or the like.

Figure 3:
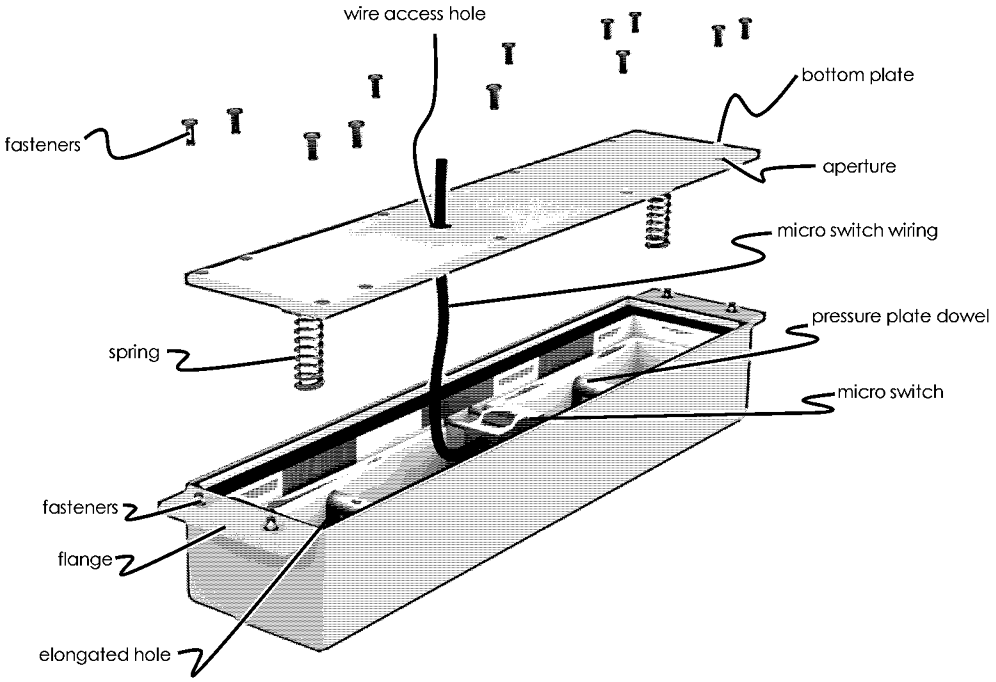
FIG. 3 is an exploded perspective view of the traffic signal switch with the bottom plate separated from the housing according to an embodiment of the present invention.

FIG. 3 of the present application is an exploded perspective view of the traffic signal switch with the bottom plate separated from the housing. The bottom plate can be attached to the housing by a plurality of fasteners located along a circumference of the bottom plate. Specifically, the bottom plate can be provided with a plurality of apertures (e.g., holes extending through an entire thickness of the bottom plate), that allow for fasteners to fix the bottom plate to the housing. The apertures can also be depressions that do not extend through an entire thickness of the bottom plate, to allow the fasteners to either be flush with a top surface of the bottom plate or be recessed from the top surface of the bottom plate. Further, a seal, such as a silicon or rubberized gasket (or any type of seal), can be provided between the bottom plate and the housing to seal the traffic signal switch from liquid, such as water, and solids, such as debris.

Further, the bottom plate can include a wire access hole through which the micro switch wiring extends through, and wire access hole of the bottom plate can include a seal to allow for a water-tight connection, thereby preventing liquid, such as water, and solids, such as debris from entering the traffic signal switch. FIG. 3 illustrates the micro switch wiring, which is labeled, with a portion missing only for illustration purposes. The micro switch wiring will be continuous and will extend through the wire access hole of the bottom plate.

Further, the traffic signal switch can include at least two springs, spaced apart from one another, between the bottom plate and the housing. That is, each of the bottom plate and the housing can include multiple spring housings, each spring housing being for housing (i.e., attaching) one end of one spring to the respective component. See FIG. 4, for example, as an illustration of two (e.g., top) spring housings. That is, each spring can be fixed to the housing by two spring housings, including a top spring housing (e.g., first spring housing) and a bottom spring housing (e.g., a second spring housing). For instance, the housing can include two spring housings that attach or otherwise enclose a first end of two springs to the housing, and the bottom plate can include two spring housings that attach or otherwise enclose a second end of the two springs to the bottom plate. The first end of the two springs being opposite to the second end of the two springs.

The multiple springs permit the pressure plate assembly to retract to an original position after being pressed by a user. That is, when a user presses the pressure plate assembly to activate the at least one micro switch, a force is applied directly to the multiple springs, and the multiple springs allow the pressure plate assembly to return to its original position in which the at least one micro switch is in an inactivated state. That is, in the original position (e.g., first position), in which no force is being applied to the pressure plate, the micro switch is in an inactivated state. Further, a user pushing/pressing the pressure plate causes the pressure plate to move to a moved position (e.g., a second position) to activate the micro switch, which causes a signal to be sent through the micro switch wiring to a controller of an existing traffic signal or directly to another component of the existing traffic signal.

The pressure plate assembly can have a rectangular shape and can be in the form of a box having a rear side that is opened to allow for insertion of the micro switch therein. Further, the pressure plate assembly can include elongated holes (e.g., elongated slots), that can be symmetrically disposed about a width of the pressure plate assembly, for receiving pressure plate dowels, which can be in the form of cylinders as shown in FIG. 3. The elongated holes can be elongated in a height direction of the pressure plate assembly, and the elongation allows for movement of the pressure plate assembly relative to the housing, while maintaining a connection between the pressure plate assembly and the housing via the pressure plate dowels. That is, in an original position (i.e., a resting position) of the pressure plate assembly, in which the multiple springs maintain the original position of the pressure plate assembly, the pressure plate dowels contact a rear surface of the elongated holes. Further, in a fully pressed position, the pressure plate dowels contact a front surface of the elongated holes to limit movement of the pressure plate assembly.

FIG. 3 further illustrates two flanges of the housing, with each flange extending from a respective end of the housing to allow for connection of a clamp, as discussed above. That is, the housing can include a first flange extending from a first longitudinal end of the housing and a second flange extending from a second longitudinal end of the housing, the second longitudinal end of the housing being opposite to the first longitudinal end of the housing.

Figure 4:
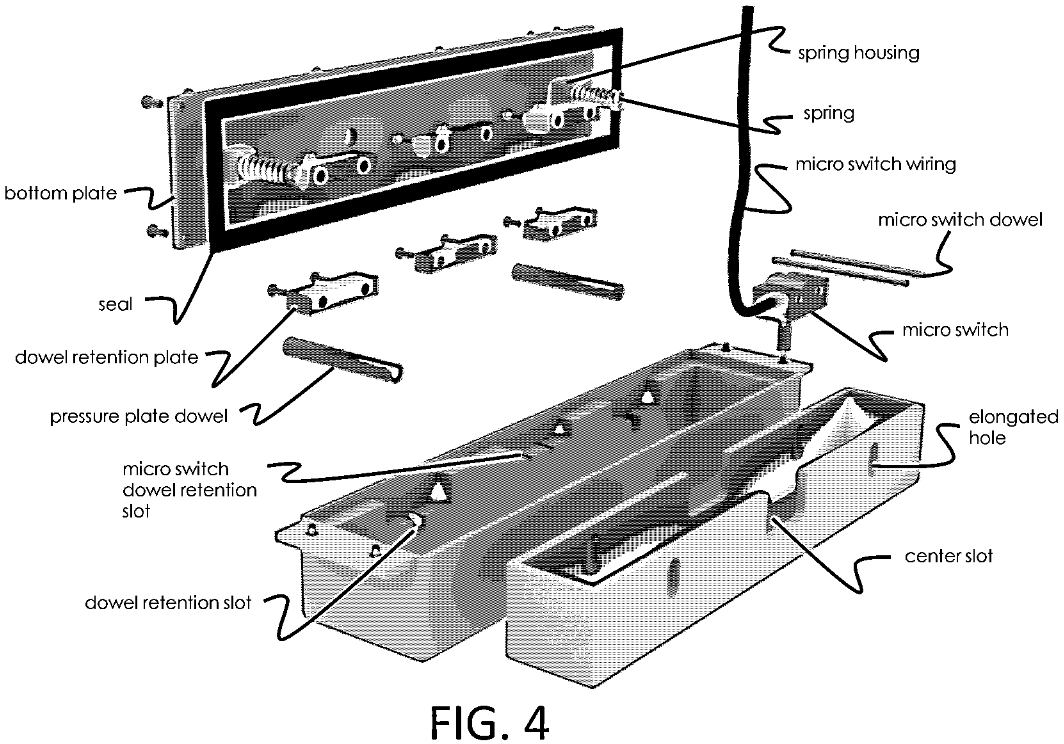
FIG. 4 is an exploded view of the traffic signal switch according to an embodiment of the present invention.

FIG. 4 is an exploded view of the traffic signal switch according to an embodiment of the present invention. The housing can include four dowel retention slots for retaining the pressure plate dowels and two micro switch dowel retention slots for retaining at least one micro switch dowel. Any number of dowel retention slots can be provided to correspond to any number of pressure plate dowels, depending on the size and shape of the traffic light switch. The dowel retention slots can be symmetrically disposed in the housing. FIG. 4 illustrates two opposing micro switch dowel retention slots, and four opposing dowel retention slots.

Each dowel retention slot can be in the form of a circular groove for receiving one of the pressure plate dowels and can further include a rectangular groove for receiving a respective dowel retention plate. Each dowel retention plate can be attached to the housing by fasteners, and can be sized and shaped to fasten the respective pressure plate dowel to the housing. Further, the circular groove can be substantially the same size (e.g., or exactly the same size) as the respective pressure plate dowel.

As shown in FIG. 4, the pressure plate assembly can include two center slots (e.g., pressure plate cutouts in FIG. 13) located substantially at a center of the length of the pressure plate, for allowing movement of the pressure plate assembly with respect to housing while avoiding contact between the at least one micro switch dowel and the pressure plate assembly.

The at least one micro switch dowel can be provided in plurality as shown in FIG. 4, in which two micro switch dowels are illustrated as being spaced apart from one another and extending through corresponding holes of the micro switch to retain the micro switch to the housing. Further, each micro switch dowel retention slot of the housing includes a respective dowel retention plate and can further include a circular groove for each micro switch dowel. That is, assembly of the dowel retention plates to the micro switch dowel retention slots fixes the micro switch dowels to the housing.

FIG. 4 illustrates six separate dowel retention plates, including four dowel retention plates for retaining the two pressure plate dowels to the housing, and two dowel retention plate for retaining the two micro switch dowels to the housing. Each dowel retention plate includes holes to allow to receive fasteners that attach the dowel retention plate to the housing. The fasteners can be as described above. Greater or less than four dowel retention plates can be used. The dowel retention plates can otherwise be attached to the housing using an adhesive, such as an epoxy, or the like.

Figure 5:
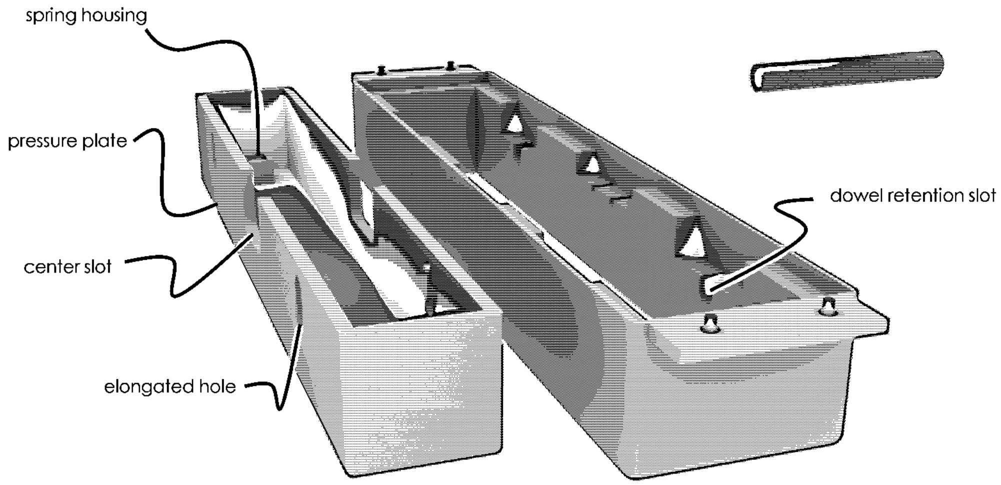
FIG. 5 is an exploded view of the housing and the pressure plate assembly of the traffic signal switch according to an embodiment of the present invention.

FIG. 5 is an exploded view of the housing and the pressure plate assembly of the traffic signal switch according to an embodiment of the present invention, illustrating the spring housing of the pressure plate, the center slots of the pressure plate and the dowel retention slots of housing.

Figure 6:
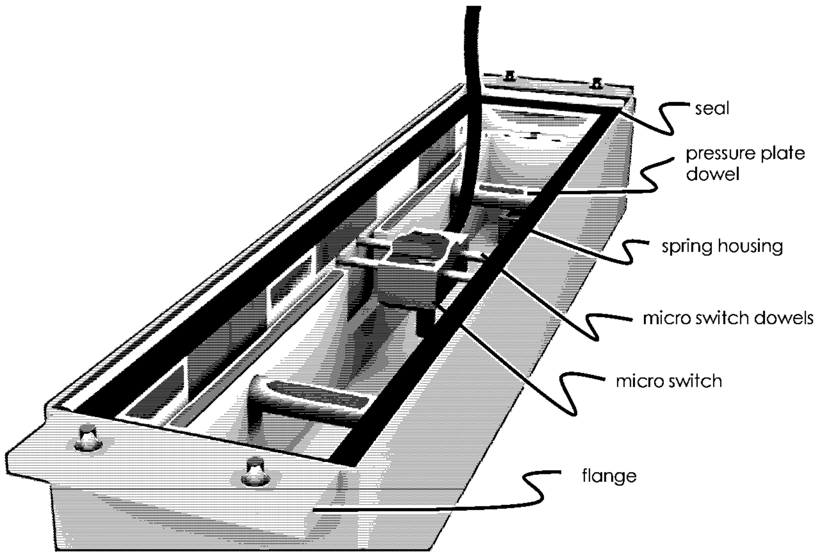
FIG. 6 is a top perspective view of the traffic signal switch with the bottom plate removed according to an embodiment of the present invention.
Figure 7:
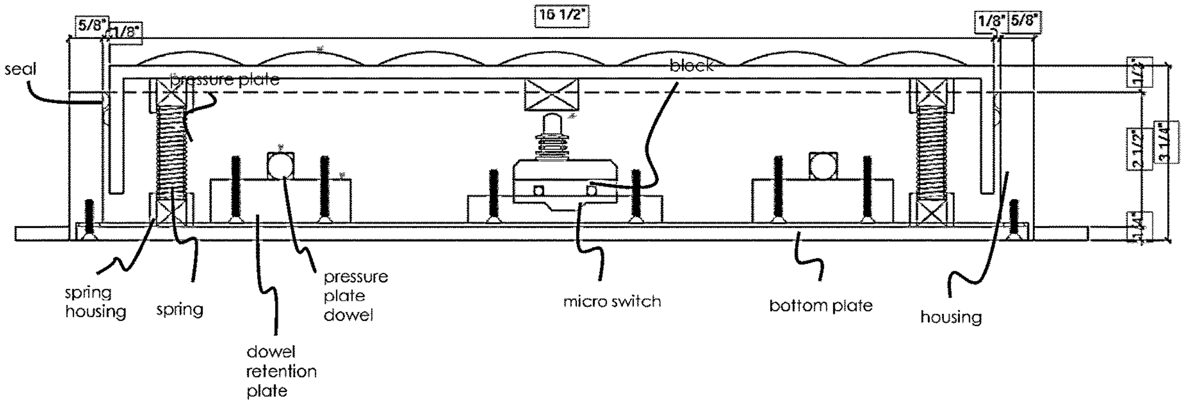
FIG. 7 is a cross-sectional view of the traffic signal switch illustrating the internal features of the pressure plate assembly according to an embodiment of the present invention.

FIG. 6 is a top perspective view of the traffic signal switch with the bottom plate removed according to an embodiment of the present invention. FIG. 6 illustrates a zoomed in view of the micro switch being connected to the housing via the micro switch dowels, the wire of the micro switch, the pressure plate dowels and the spring housing of the pressure plate. As shown in FIG. 6, the micro switch can include a lever or other known component extending therefrom towards a pressure plate micro switch housing, as shown in FIG. 7. When a user presses the pressure plate, the pressure plate micro switch housing contacts the micro switch to activate the micro switch, as known in the art. For instance, the micro switch can be a Honeywell BZ series switch, or any other known switch.

FIGS. 7-10 are illustrated to scale, in order to provide relative sizes of the components of the traffic signal switch. However, the dimensions of the traffic signal switch and its components can be altered to different sizes and shapes, according to desired constraints. and FIG. 7 is a cross-sectional view of the traffic signal switch illustrating the internal features of the pressure plate assembly according to an embodiment of the present invention. Specifically, FIG. 7 illustrates the springs between the pressure plate assembly and the housing, the micro switch, the pressure plate micro switch housing, and fasteners for connecting the dowel retention plates to the housing and fasteners for connecting the bottom plate to the housing. In FIG. 7, the dowel retention plate can also be referred to as a "cylinder plate," however, these terms can be interchangeable throughout this disclosure. Further, FIG. 7 the pressure plate dowel can also be referred to as a "cylinder," however, these terms are interchangeable throughout this disclosure. That is, the pressure plate dowels and/or the micro switch dowels can be referred to as cylinders, as they can have a cylindrical shape.

Further, the traffic signal switch of the present invention can include one or more seal members between the pressure plate assembly and the housing to create a water-tight seal. That is, the one or more seal members can prohibit the entrance of liquid, such as water, and solids, such as debris. The one or more seal members can comprise nylon, rubber, silicon, or any other known sealing material.

FIG. 7 also illustrates a block attached to the pressure plate, that operates in conjunction with the micro switch. Movement of the pressure plate, such as by a user pressing the pressure plate, causes the micro switch to contact the block, in order to activate the switch and send an appropriate signal indicating that pedestrians are present in the intersection the traffic signal switch is located. The block is sized specifically to operate with the micro switch, and in consideration of a movement amount of the pressure plate upon user activation.

Figure 8:
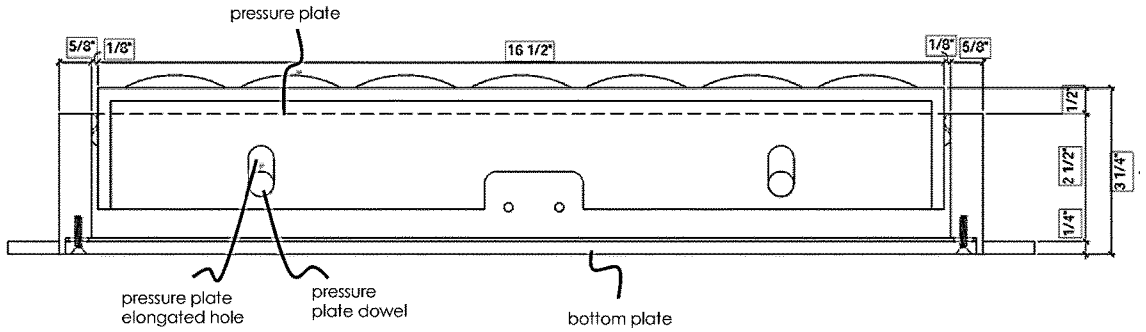
FIG. 8 is a side cross-sectional view of the traffic signal switch illustrating the pressure plate dowels according to an embodiment of the present invention.

FIG. 8 is a side cross-sectional view of the traffic signal switch illustrating the pressure plate dowels according to an embodiment of the present invention. That is, FIG. 8 illustrates the pressure plate dowels provided within the elongated slots of the pressure plate assembly and extending between the housing and the pressure plate assembly in a width direction of the traffic signal switch.

Although particular dimensions are illustrated in FIGS. 9-15, the traffic signal switch can be altered to have any shape and size.

Figure 9:
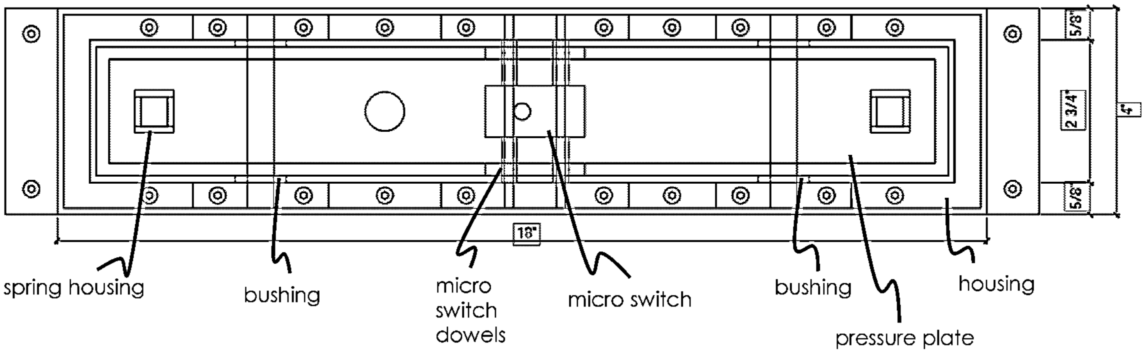
FIG. 9 is a bottom cross-sectional view of the traffic signal switch the spring housings, the micro switch and the wire access hole according to an embodiment of the present invention.

FIG. 9 is a bottom cross-sectional view of the traffic signal switch, the spring housings, the micro switch and the wire access hole according to an embodiment of the present invention. The spring housings can be spaced apart from one another and FIG. 9 illustrates the micro switch connected to the housing via the micro switch dowels, the pressure plate dowels, the wire access hole of the bottom plate, and the plurality of fasteners of the bottom plate of the dowel retention plates.

The pressure plate dowels lock in the pressure plate assembly (labeled as the pressure plate) to the housing. Further, four bushings can surround the pressure plate dowels between the pressure plate assembly and the housing in a width direction of the traffic signal switch. However, any number of bushings can be provided to correspond to the number of pressure plate dowels (e.g., two bushings for each pressure plate dowel), and the bushings can be comprised of nylon or any other material.

Figure 10:
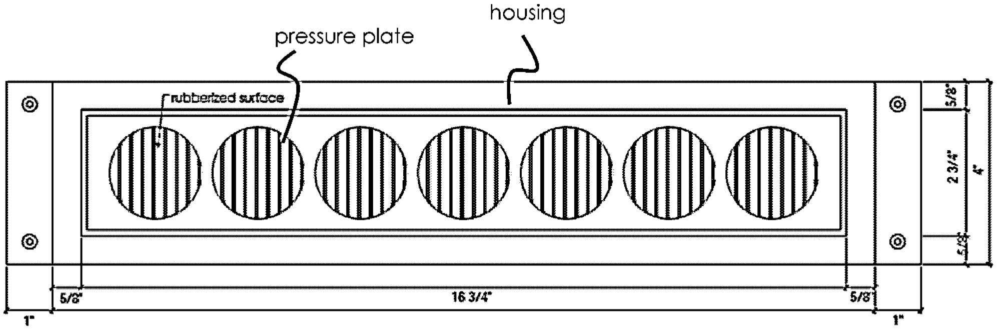
FIG. 10 is a front view of the traffic signal switch according to an embodiment of the present invention.

FIG. 10 is a front view of the traffic signal switch according to an embodiment of the present invention. FIG. 10 illustrates another embodiment in which seven large circular protrusions or grooves are shown, which can be a surface comprised of rubber (i.e., a rubberized surface) or can be comprised of any type of material. However, any number of protrusions or grooves can be provided. These protrusions or grooves provide a frictional contact surface to allow a user to contact a front surface of the pressure plate assembly, while minimizing slipping of the user's foot (or any other extremity).

Figure 11:
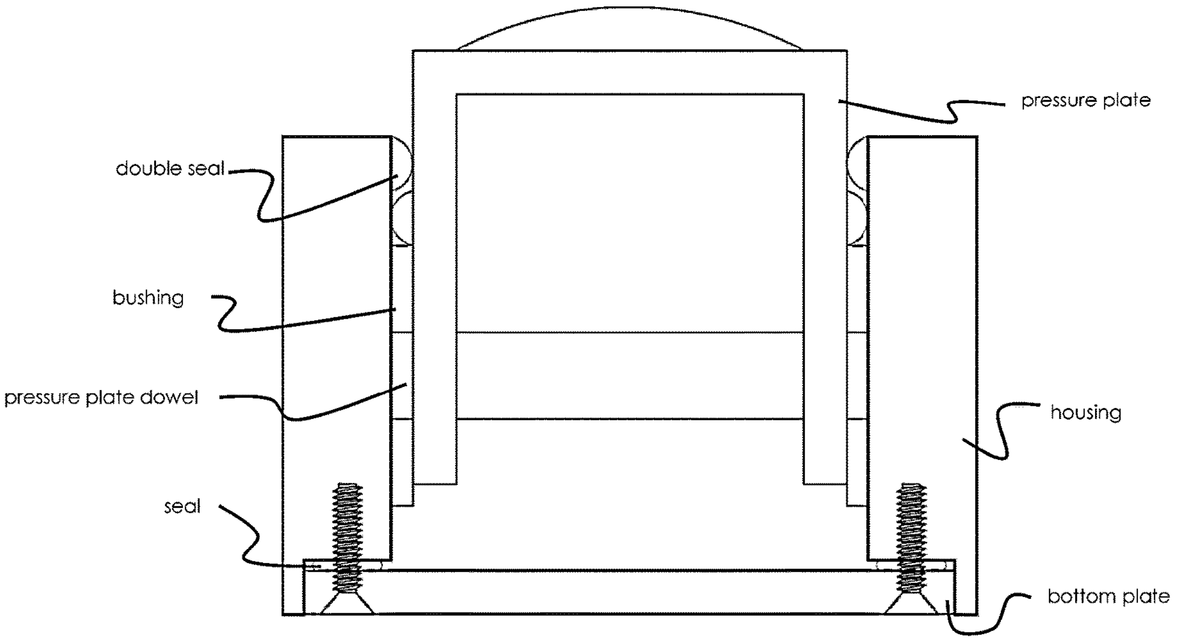
FIG. 11 is a side cross-sectional view about C1 of FIG. 15 illustrating a connection between the bottom plate and the housing, and a connection between the pressure plate assembly and the housing, according to an embodiment of the present invention.
Figure 15:
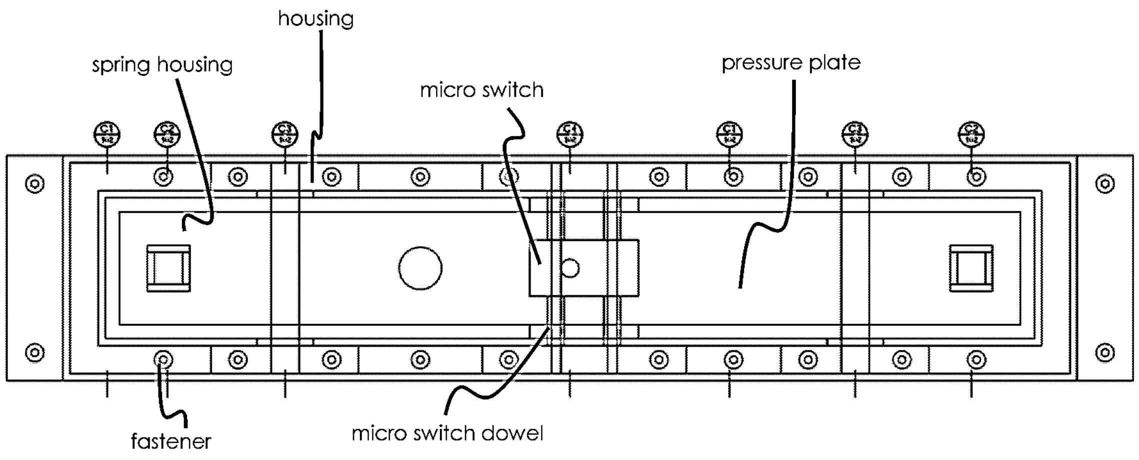
FIG. 15 is a top cross-sectional view illustrating the traffic signal switch according to an embodiment of the present invention.

FIG. 11 is a side cross-sectional view about C1 of FIG. 15 illustrating a connection between the bottom plate and the housing, and a connection between the pressure plate assembly and the housing, according to an embodiment of the present invention. The bottom plate is connected to the housing via a plurality of fasteners. Further, FIG. 11 illustrates a double rubber seal between the pressure plate and the housing, a nylon bushing surround each of first and second opposite ends of the pressure plate dowels, and the extension of the pressure plate assembly relative to the housing in a length direction of the traffic light switch. That is, the pressure plate assembly extends past the housing in the length direction to permit a user to more easily press the pressure plate assembly, which activates the micro switch, as noted above. Alternatively, a front surface of the pressure plate assembly can be flush with a front surface of the housing.

Further, a seal (which can be comprised rubber, silicon or any other material) is provided between the bottom plate and the housing, and can be in the form of a double seal.

Figure 12:
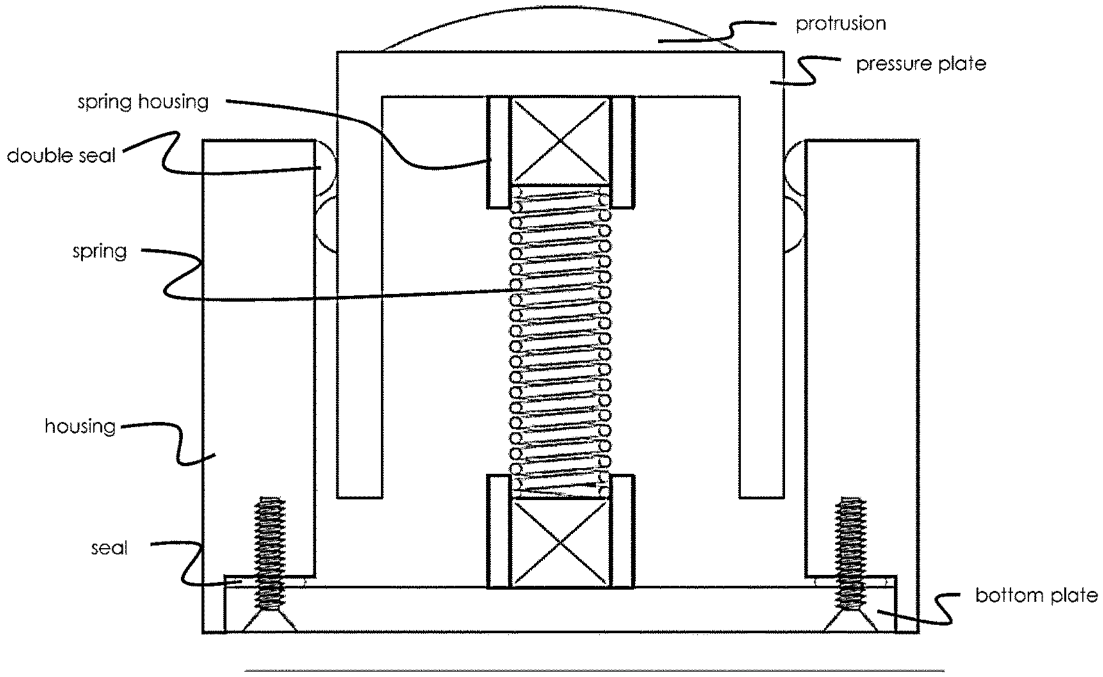
FIG. 12 is a side cross-sectional view about C2 of FIG. 15 illustrating the spring extending in respective spring housings of the pressure plate assembly and the bottom plate, according to an embodiment of the present invention.

FIG. 12 is a side cross-sectional view about C2 of FIG. 15 illustrating the spring extending into respective spring housings of the pressure plate assembly and the bottom plate, according to an embodiment of the present invention. Each spring housing includes a pocket that is sized specifically to receive a spring (i.e., among a plurality of springs) and includes a protrusion portion extending past the spring to retain the spring in the spring housing. As noted in FIG. 12, the spring "raises the pressure plate," or biases the pressure plate assembly outward to an "original" or "rest" position. From this original position, a user can push or press the front surface of the pressure plate assembly to activate the micro switch, which in turns communicates to the traffic signal controller that a user is present and desires to cross a crosswalk (i.e., walk across an intersection), as known in the art.

Figure 13:
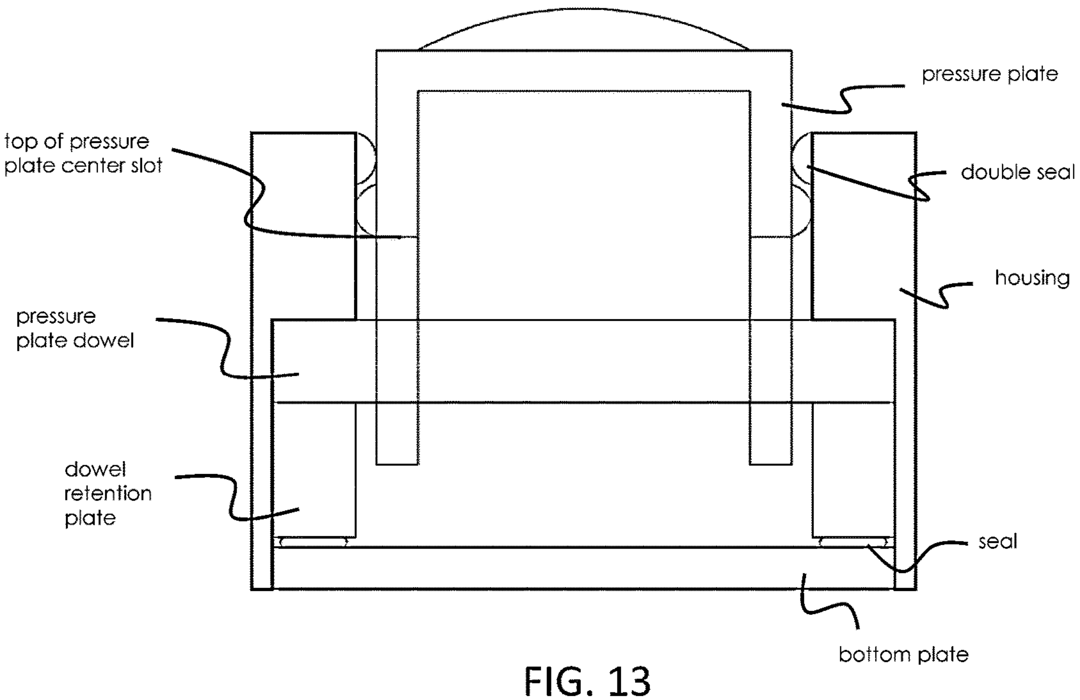
FIG. 13 is a side cross-sectional view about C3 of FIG. 15 illustrating the pressure plate dowels (i.e., cylinder) that attaches the pressure plate assembly to the housing according to an embodiment of the present invention.

FIG. 13 is a side cross-sectional view about C3 of FIG. 15 illustrating the pressure plate dowels (i.e., cylinder) that attaches the pressure plate assembly to the housing according to an embodiment of the present invention. Further, the "top of pressure plate cutout" refers to the center slots of the pressure plate assembly shown in FIGS. 4 and 5 above.

Figure 14:
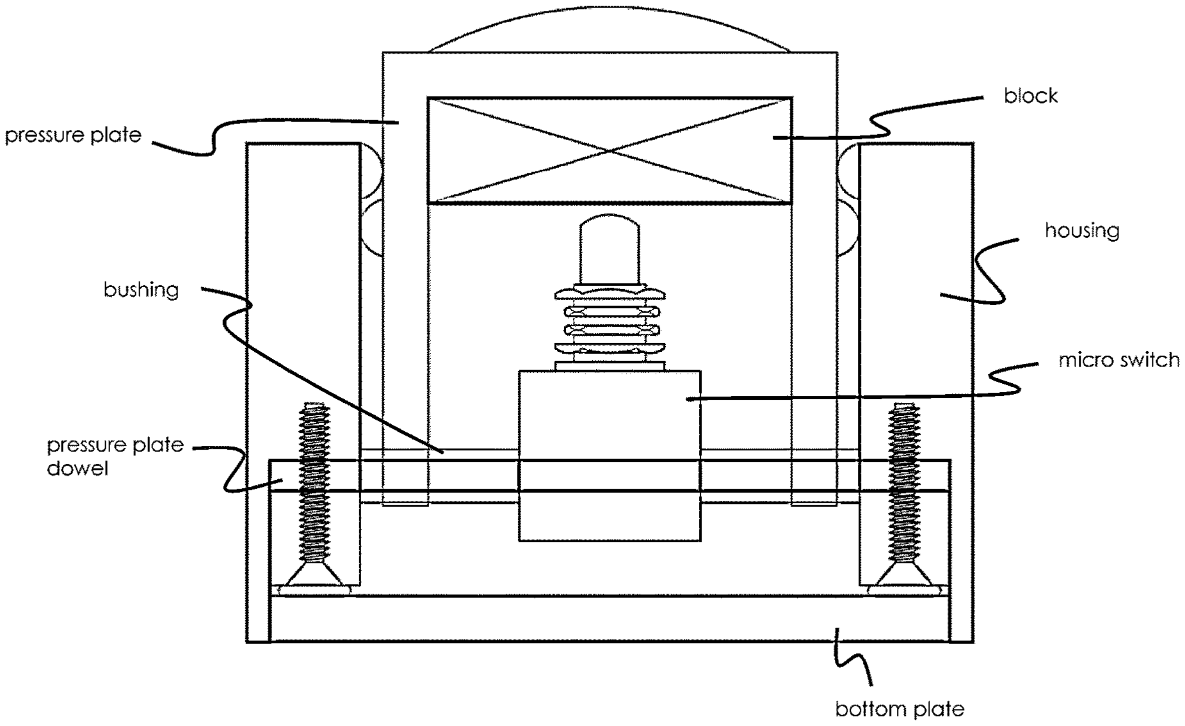
FIG. 14 is a side cross-sectional view about C4 of FIG. 15 illustrating the micro switch, the pressure plate assembly and the housing according to an embodiment of the present invention.

FIG. 14 is a side cross-sectional view about C4 of FIG. 15 illustrating the micro switch, the pressure plate assembly and the housing according to an embodiment of the present invention. The micro switch is shown connected to the housing and facing the pressure plate micro switch housing. When a user presses the pressure plate, the pressure plate micro switch housing (labeled as a block in the FIG. 7) engages the micro switch, in order to activate the micro switch, which in turn activates a pedestrian crosswalk traffic light. The activation of the pedestrian crosswalk traffic light is performed as known in the art. That is, the wire(s) extending from the micro switch are to be directly electrically spliced into an existing pedestrian traffic light switch. For instance, the wire(s) of the micro switch can be brazed, soldered or otherwise electrically connected to the wiring of the existing pedestrian traffic light switch.

Further, the micro switch dowels extend through the micro switch to connect the micro switch to two corresponding dowel retention plates (labeled as cylinder plates), and the dowel retention plates are connected to the housing via fasteners, the fasteners being threaded and engaging a female threaded hole of the housing.

FIG. 15 is a top cross-sectional view illustrating the traffic signal switch according to an embodiment of the present invention. FIG. 15 illustrates the combination of C1-C4 (i.e., FIGS. 11-14) above.

FIGS. 16-24 illustrate an alternate embodiment of the present invention, which lacks the spring housing of the embodiment of FIGS. 7-15 and utilizing a different type of switch A. However, the other elements of the traffic signal switch of FIGS. 7-15 can be the same as those in FIGS. 16-24. For instance, the "other elements" include the attachment of the bottom plate to the housing via a plurality of fasteners, the wire access hole, the micro switch wiring, the pressure plate dowels and corresponding elongated holes of the pressure plate, the dowel retention plates for securing the pressure plate dowels and the micro switch dowels to the housing, and likewise, the dowel retention slots and micro switch slot, and the pressure plate including a center slots.

Figure 16:
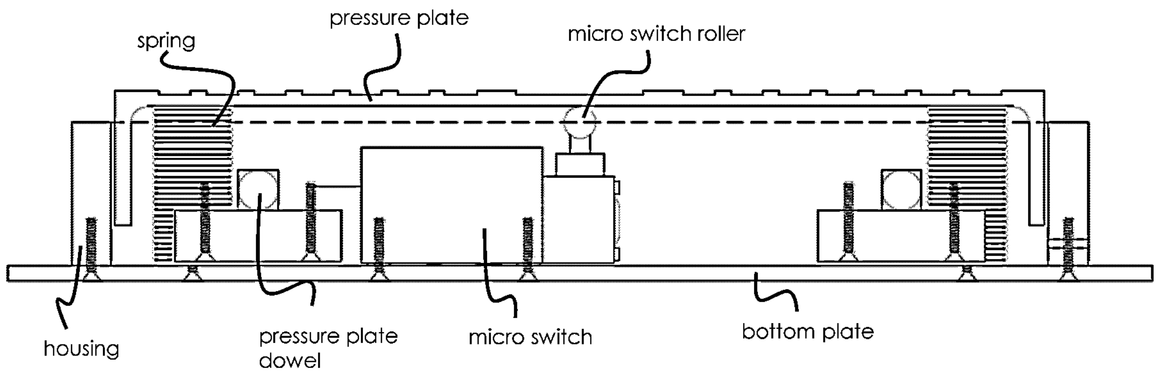
FIG. 16 is a cross-sectional view illustrating the traffic signal switch according to an embodiment of the present invention.

FIG. 16 is a cross-sectional view illustrating the traffic signal switch according to an embodiment of the present invention. Near the screw(s) G, shown in FIG. 16, one or more weep holes can be provided to allow for water to be removed from the traffic signal switch.

The switch A can be any type of limit switch, such as those produced by Allen-Bradley, which has a side-push horizontal roller that contacts the pressure plate upon a user pushing the pressure plate to activate the traffic signal switch. This include Allen-Bradley #805T-KE limit switch with a side push horizontal roller. However, any type of limit spring with a horizontal roller can be used. This embodiments does not include a block for the micro switch, as the micro switch is designed to move when the roller of the micro switch contacts the pressure plate (i.e., in response to a user pressing the pressure plate).

Instead of a spring housing, each of the springs according to the alternate embodiment utilizes a spring dowel to locate and maintain each spring in their respective positions. The spring dowels can comprise any material and can have a diameter up to the diameter of the respective spring. Further, the spring dowels can be in the form of a cylinder, and therefore can be referred to as a spring cylinder, or the like.

The pressure plate can be as described with respect to FIGS. 7-15 above, and therefore, its description is omitted. Similar to FIGS. 7-15 above, the back cover can be fixed to the housing by any number of fasteners.

Figure 17:
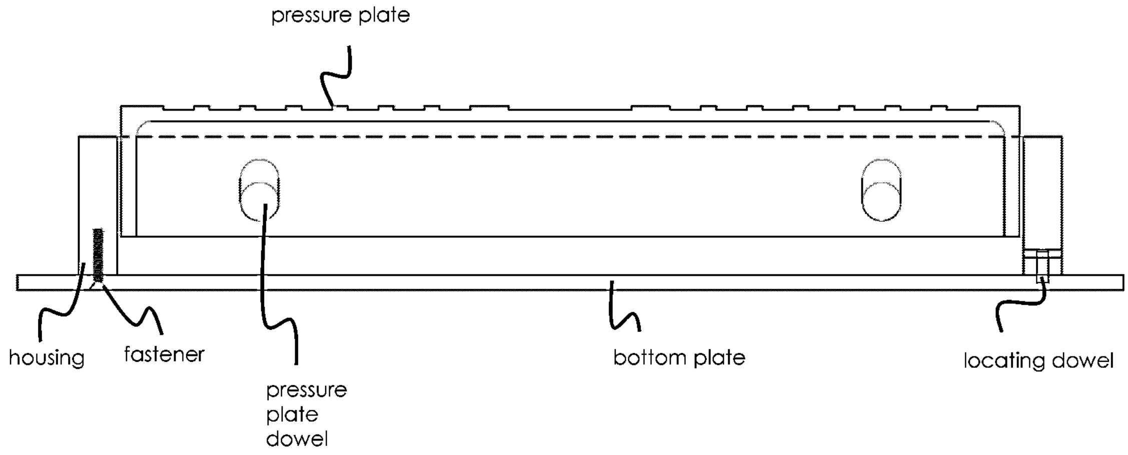
FIG. 17 is an elevation section at the pressure plate according to an embodiment of the present invention.

FIG. 17 is an elevation section at the pressure plate according to an embodiment of the present invention. A locating dowel can be provided to locate the bottom plate to the housing during assembly, which is shown on the right side of FIG. 17. As in FIGS. 7-15. The housing is connected to the bottom plate via fasteners, such as screws, bolts and the like. The pressure plate dowel (which can also be referred to as a "dowel").

Figure 18:
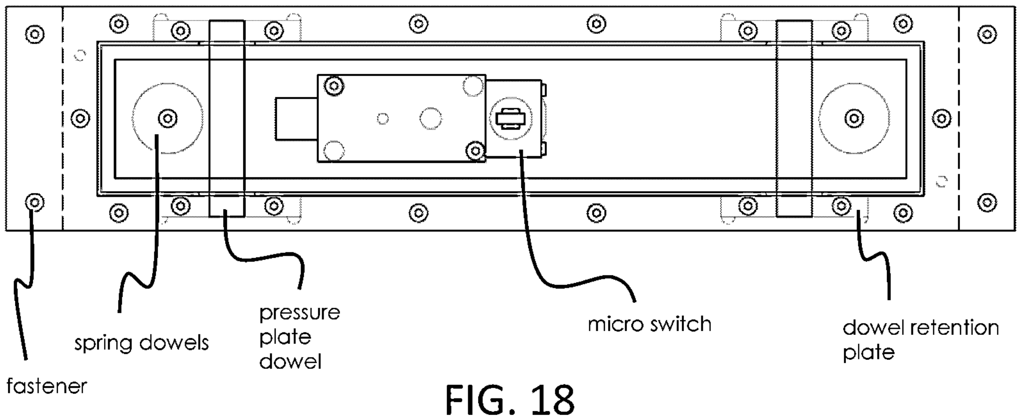
FIG. 18 is a top cross-sectional view illustrating the traffic signal switch according to an embodiment of the present invention.

FIG. 18 is a top cross-sectional view illustrating the traffic signal switch according to an embodiment of the present invention. FIG. 18 illustrates a top view of the spring dowels, and the springs, which are not shown in FIG. 18, surround the spring dowels and are secured to the housing and the pressure plate by the spring dowels. Further, as shown in FIG. 18, each spring dowel is attached to both the pressure plate and the housing by at least one fastener extending therethrough. The fastener can be of the type described above.

The micro switch can be positioned any horizontal (i.e., lateral) location within the housing, however, it is preferable that the micro switch be positioned at a horizontal center of the housing, or for a center of mass of the micro switch to be positioned at a center of mass of the housing to improve weight and balance of the traffic signal switch.

Figure 19:
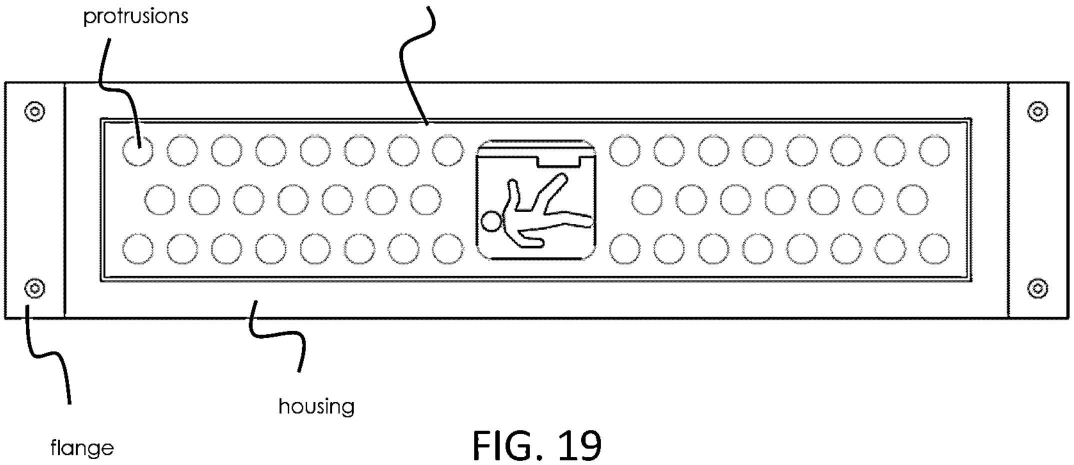
FIG. 19 is a top plan view illustrating the traffic signal switch according to an embodiment of the present invention.

FIG. 19 is a top plan view illustrating the traffic signal switch according to an embodiment of the present invention. The pressure plate can include a plurality of protrusions (e.g., grips or gripping members), as shown in FIG. 19. The protrusions or grips provide additional friction to allow a user to more easily contact and press/push/otherwise contact the pressure plate. Instead of protrusions, the pressure plate can be provided with a plurality of depressions. In either instance, the protrusions or depressions should have a friction coefficient higher than that of the other contact areas of the pressure plate.

Figure 20:
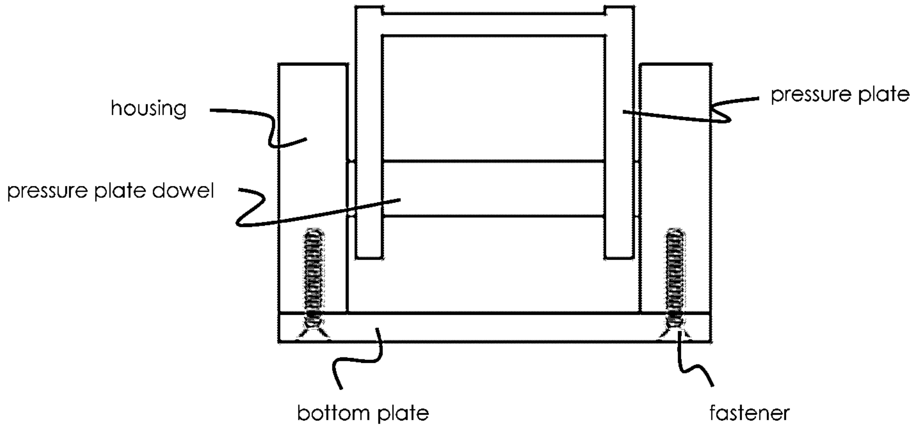
FIG. 20 a side cross-sectional view about E1 of FIG. 24 illustrating a connection between the bottom plate and the housing, and a connection between the pressure plate assembly and the housing, according to an embodiment of the present invention.
Figure 24:
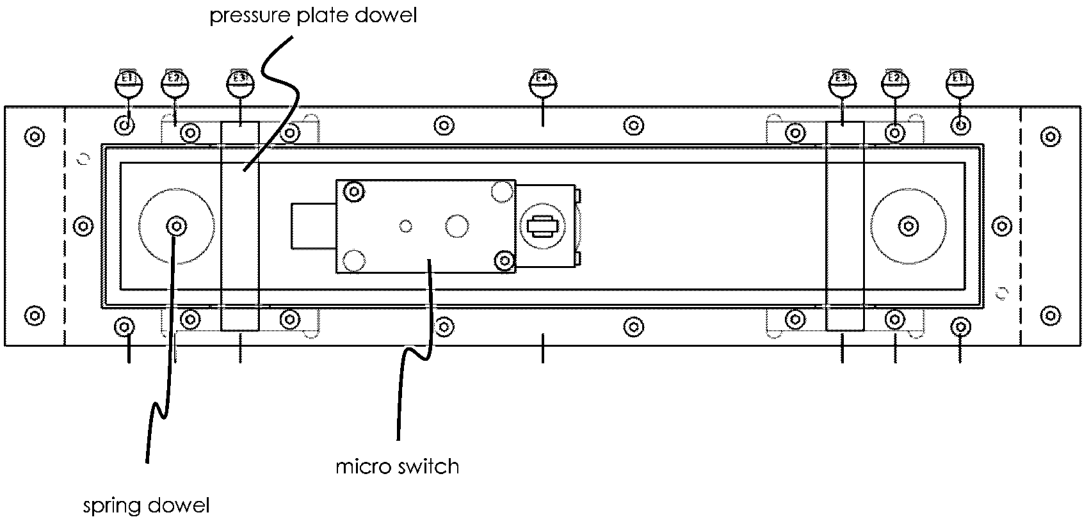
FIG. 24 is a top cross-sectional view illustrating the traffic signal switch according to an embodiment of the present invention.

FIG. 20 a side cross-sectional view about E1 of FIG. 24 illustrating a connection between the bottom plate and the housing, and a connection between the pressure plate assembly and the housing, according to an embodiment of the present invention. The connection between the bottom plate and the housing can be made by a plurality of fasteners, as shown in FIG. 20. Further, the pressure plate can be connected to the housing by a plurality of pressure plate dowels, in the same manner of FIGS. 3-15, in which the housing is provided with dowel retention slots, which are fitted with dowel retention plates, as described above.

Figure 21:
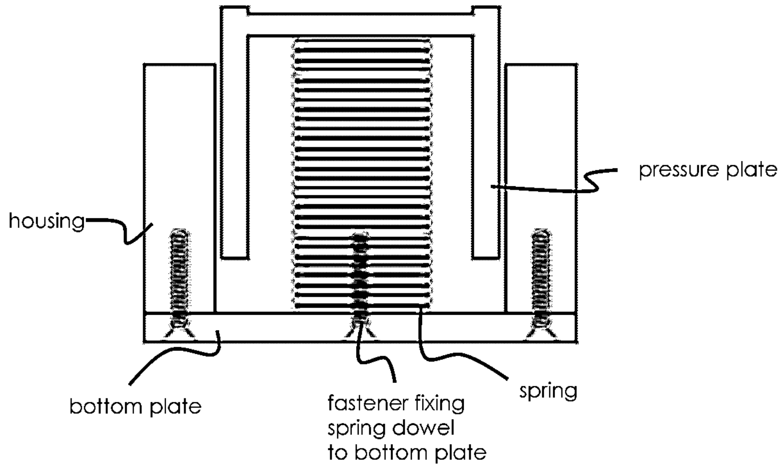
FIG. 21 a side cross-sectional view about E2 of FIG. 24 illustrating the spring extending between the pressure plate assembly and the bottom plate, according to an embodiment of the present invention FIG. 22 a side cross-sectional view about E3 of FIG. 24 illustrating the pressure plate dowels (i.e., cylinder) that attaches the pressure plate assembly to the housing according to an embodiment of the present invention.

FIG. 21 a side cross-sectional view about E2 of FIG. 24 illustrating the spring extending between the pressure plate assembly and the bottom plate, according to an embodiment of the present invention. To fasten the spring dowel to the bottom plate, a fastener is provided, which extends through the bottom plate and is threadingly engaged with the spring dowel.

Figure 22:
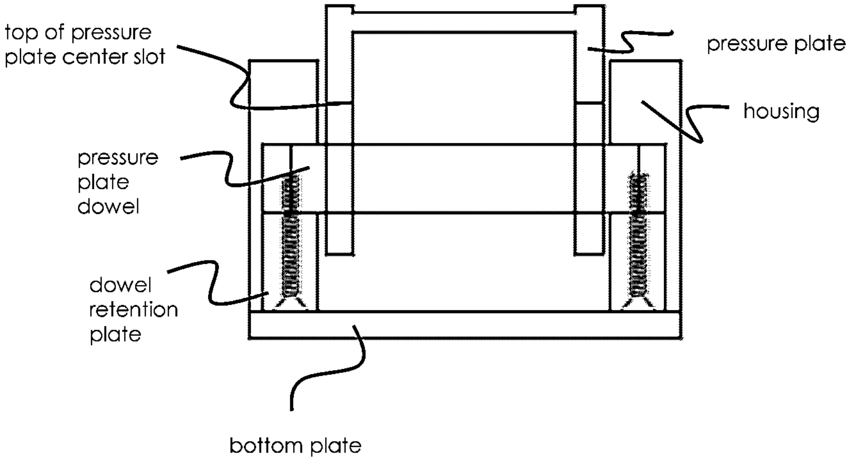

FIG. 22 a side cross-sectional view about E3 of FIG. 24 15 illustrating the pressure plate dowels (i.e., cylinder) that attaches the pressure plate assembly to the housing according to an embodiment of the present invention. FIG. 22 also illustrates the pressure plate cutout, including a top thereof, the pressure plate dowel, and the dowel retention plate. The fasteners connecting the bottom plate to the housing are shown as extending past the pressure plate dowel, however, this is not required. Instead, the fasteners connecting the bottom plate to the housing can extend up to the pressure plate dowel, or less than the distance between the bottom plate and the pressure plate dowel, so long as the bottom plate is secured to the housing.

The pressure plate dowel can also be an 18 mm in diameter and be comprised of stainless steel, and this particular size can accommodate a ½ inch movement of the pressure plate. That is, the pressure plate dowel, together with the elongated hole of the pressure plate, can be size to specify a maximum movement of the pressure plate.

Figure 23:
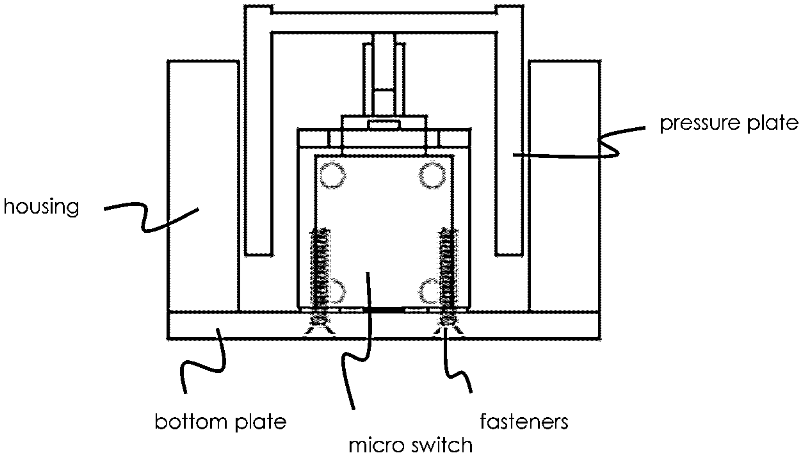
FIG. 23 a side cross-sectional view about E4 of FIG. 24 illustrating the micro switch, the pressure plate assembly and the housing according to an embodiment of the present invention.

FIG. 23 a side cross-sectional view about E4 of FIG. 24 illustrating the micro switch, the pressure plate assembly and the housing according to an embodiment of the present invention. Specifically, the micro switch can be connected to the bottom plate by one or more fasteners. This is opposed to the connection of the micro switch in the embodiment of FIGS. 7-15, which connected the micro switch to the housing by micro switch slots.

FIG. 24 is a top cross-sectional view illustrating the traffic signal switch according to an embodiment of the present invention, which provides a basis for the cross-sectional views of FIGS. 20-23.

The present invention encompasses various modifications to each of the examples and embodiments discussed herein. According to the invention, one or more features described above in one embodiment or example can be equally applied to another embodiment or example described above. The features of one or more embodiments or examples described above can be combined into each of the embodiments or examples described above. Any full or partial combination of one or more embodiment or examples of the invention is also part of the invention.

Various embodiments described herein may be implemented in a computer-readable medium using, for example, software, hardware, or some combination thereof. For example, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, other electronic units designed to perform the functions described herein, or a selective combination thereof. In some cases, such embodiments are implemented by the controller. That is, the controller is a hardware-embedded processor executing the appropriate algorithms (e.g., flowcharts) for performing the described functions and thus has sufficient structure. Also, the embodiments such as procedures and functions may be implemented together with separate software modules each of which performs at least one of functions and operations. The software codes can be implemented with a software application written in any suitable programming language. Also, the software codes can be stored in the memory and executed by the controller, thus making the controller a type of special purpose controller specifically configured to carry out the described functions and algorithms. Thus, the components shown in the drawings have sufficient structure to implement the appropriate algorithms for performing the described functions.

The present invention being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A traffic signal switch, comprising:

a housing;

a micro switch connected to the housing via two micro switch dowels, the micro switch including wiring that is configured to be connected to wiring of an existing traffic signal switch;

a pressure plate movably connected to the housing, pressing of the pressure plate by a user causes activation of the micro switch; and a bottom plate connected to a rear face of the housing, wherein the pressure plate moves linearly with respect to the housing, wherein the housing includes a plurality of dowel retention slots, wherein the traffic signal switch further includes a plurality of dowels being retained in the plurality of dowel retention slots, the plurality of dowels connecting the pressure plate to the housing, wherein the housing further includes two micro switch dowel retention slots, wherein the two micro switch dowels are retained in the two micro switch dowel retention slots, and wherein the pressure plate includes two center slots for allowing movement of the pressure plate with respect to housing while avoiding contact between the micro switch dowels and the pressure plate.

2. The traffic signal switch of claim 1, wherein the housing includes flanges extending from lateral ends of the housing, and wherein the flanges of the housing allow for the traffic signal switch to be connected to a fixed object by a mechanical clamping means.

3. The traffic signal switch of claim 1, further comprising a plurality of springs connected between the pressure plate and the bottom plate, wherein the plurality of springs permit the pressure plate to return to an original position after being pressed by the user.

4. The traffic signal switch of claim 3, wherein each of the plurality of springs is fixed between the pressure plate and the bottom plate by a spring dowel, and wherein each spring dowel is fastened to the pressure plate and to the bottom plate by a fastener.

5. The traffic signal switch of claim 1, wherein the micro switch includes a micro switch roller that is configured to contact the pressure plate due to pressing of the pressure plate by the user, to cause the micro switch to activate.

6. The traffic signal switch of claim 1, wherein the pressure plate is provided with a plurality of protrusions, and wherein the plurality of protrusions have a friction coefficient higher than other portions of the pressure plate.

7. A traffic signal switch, comprising:

a housing;

a micro switch connected to the housing via two micro switch dowels, the micro switch including wiring that is configured to be connected to wiring of an existing traffic signal switch;

a pressure plate movably connected to the housing, pressing of the pressure plate by a user causes activation of the micro switch; and a bottom plate connected to a rear face of the housing, wherein the housing includes a plurality of dowel retention slots, wherein the traffic signal switch further includes a plurality of dowels being retained in the plurality of dowel retention slots, the plurality of dowels connecting the pressure plate to the housing, wherein the pressure plate includes a plurality of elongated holes, wherein each of the plurality of dowels extends through a respective one of the plurality of elongated holes of the pressure plate and a space is provided between each of the plurality of dowels and a portion of the respective elongated hole, and wherein the space provided between each of the plurality of dowels and the portion of the respective elongated hole allows for relative movement of the pressure plate with respect to the housing.

8. The traffic signal switch of claim 7, further comprising a plurality of dowel retention plates disposed in the dowel retention slots and fixing the plurality of dowels to the housing.

9. The traffic signal switch of claim 8, wherein each dowel retention slot includes a circular groove for accommodating a respective one of the plurality of dowels and a rectangular groove for accommodating a respective one of the plurality of dowel retention plates.

10. A method of assembling a traffic signal switch to an existing traffic pole, the method comprising:

providing a traffic signal switch, the traffic signal including:

a housing;

a micro switch connected to the housing via two micro switch dowels and including wiring;

a pressure plate movably connected to the housing, pressing of the pressure plate by a user causes activation of the micro switch; and a bottom plate connected to a rear face of the housing, wherein the pressure plate moves linearly with respect to the housing;

attaching the traffic signal switch to the existing traffic pole; and connecting the wiring of the micro switch to existing wiring of an existing traffic signal switch, wherein the housing includes a plurality of dowel retention slots, wherein the traffic signal switch further includes a plurality of dowels being retained in the plurality of dowel retention slots, the plurality of dowels connecting the pressure plate to the housing, wherein the pressure plate includes a plurality of elongated holes, wherein each of the plurality of dowels extends through a respective one of the plurality of elongated holes of the pressure plate and a space is provided between each of the plurality of dowels and a portion of the respective elongated hole, and wherein the space provided between each of the plurality of dowels and the portion of the respective elongated hole allows for relative movement of the pressure plate with respect to the housing.

11. The method of claim 10, wherein the housing includes flanges extending from lateral ends of the housing, and wherein the method further comprises connecting the flanges of the housing allow to a fixed object via at least one clamp.

12. The traffic signal switch of claim 10, wherein the traffic signal switch further includes a plurality of dowel retention plates disposed in the dowel retention slots and fixing the plurality of dowels to the housing, and wherein each dowel retention slot includes a circular groove for accommodating a respective one of the plurality of dowels and a rectangular groove for accommodating a respective one of the plurality of dowel retention plates.

13. The traffic signal switch of claim 10, wherein the traffic signal switch further includes a plurality of springs connected between the pressure plate and the bottom plate, and wherein the plurality of springs permits the pressure plate to return to an original position after being pressed by the user.

14. The traffic signal switch of claim 13, wherein each of the plurality of springs is fixed between the pressure plate and the bottom plate by a spring dowel, and wherein each spring dowel is fastened to the pressure plate and to the bottom plate by a fastener.

15. The traffic signal switch of claim 10, wherein the micro switch includes a micro switch roller that is configured to contact the pressure plate due to pressing of the pressure plate by the user, to cause the micro switch to activate.

* * * * *